United States Patent
Ohki et al.

(10) Patent No.: US 7,690,847 B2
(45) Date of Patent: Apr. 6, 2010

(54) ROLLING BEARING

(75) Inventors: Chikara Ohki, Kuwana (JP); Kikuo Maeda, Kuwana (JP)

(73) Assignee: NTN Corporation, Osaka-fu (JP)

( * ) Notice: Subject to any disclaimer, the term of this patent is extended or adjusted under 35 U.S.C. 154(b) by 776 days.

(21) Appl. No.: 10/570,345

(22) PCT Filed: Sep. 30, 2004

(86) PCT No.: PCT/JP2004/014776

§ 371 (c)(1),
(2), (4) Date: Oct. 20, 2006

(87) PCT Pub. No.: WO2005/036003

PCT Pub. Date: Apr. 21, 2005

(65) Prior Publication Data

US 2007/0151633 A1    Jul. 5, 2007

(30) Foreign Application Priority Data

Oct. 10, 2003  (JP)  ............... 2003-352988
Oct. 10, 2003  (JP)  ............... 2003-352991
Oct. 10, 2003  (JP)  ............... 2003-352992

(51) Int. Cl.
   *F16C 33/62* (2006.01)
(52) U.S. Cl. ........................ 384/492; 384/626
(58) Field of Classification Search ......... 384/618–623, 384/625, 492
   See application file for complete search history.

(56) References Cited

U.S. PATENT DOCUMENTS 5,658,082 A   8/1997  Tsushima et al.
6,290,398 B1  9/2001  Fujiwara et al.
6,488,789 B2 * 12/2002  Tajima et al. ............... 384/492
2003/0123769 A1  7/2003  Ohki
2005/0141799 A1  6/2005  Uyama et al.

FOREIGN PATENT DOCUMENTS

| | | |
|---|---|---|
| JP | 4-141572 | 5/1992 |
| JP | 7-216497 | 8/1995 |
| JP | 8-4774 | 1/1996 |
| JP | 9-53148 | 2/1997 |
| JP | 11/101247 | 4/1999 |
| JP | 2001-73072 | 3/2001 |
| JP | 2002-364648 | 12/2002 |
| JP | 2003-226919 | 8/2003 |
| JP | 2003-227518 | 8/2003 |
| JP | 2004-232669 | 8/2004 |
| JP | 2004-257556 | 9/2004 |
| WO | 98/44270 | 10/1998 |
| WO | 2005/036003 | 4/2004 |

OTHER PUBLICATIONS

International Search Report issued Feb. 22, 2005 in International (PCT) Application No. PCT/JP2004/014776 of which the present application is the U.S. National Stage.

* cited by examiner

*Primary Examiner*—Thomas R Hannon
(74) *Attorney, Agent, or Firm*—Wenderoth, Lind & Ponack, L.L.P.

(57) ABSTRACT

A rolling bearing (10) having an outer ring (1), an inner ring (2), and a plurality of rolling elements, wherein at least one of the members, the outer ring (1), inner ring (2) and rolling elements (3), has a nitrogen rich layer and the grain size number of austenite crystal grains is in the range exceeding the number 10.

10 Claims, 6 Drawing Sheets

ROLLING BEARING

TECHNICAL FIELD

The present invention relates to a rolling bearing used in speed reducers, drive pinions, transmissions and the like, and more particularly it relates to a rolling bearing having a long life in respect of rolling fatigue characteristics, and having high degrees of anti-crack strength and secular dimensional change resistance.

TECHNICAL BACKGROUND

As a heat treating method which gives a long life withstanding the rolling fatigue of bearing components, there is a method in which carbonitriding is applied to the surface layer of a bearing component as by adding ammonia gas to an atmosphere RX gas at the time of hardening heating (for example, Japanese Patent Laid-Open Hei 8-4774, and Japanese Patent Laid-Open Hei 11-101247). Using this carbonitriding makes it possible to harden the surface layer and to grow retained austenite in the microstructure, thereby improving the rolling fatigue life.

Carbonitriding requires holding high temperature for a prolonged time for diffusion treatment purposes, resulting in coarsening the structure which, in turn, makes it difficult to improve crack strength, thus leaving room for improvement in this respect. Further, there is also room for improvement in respect of an increase in secular dimensional change rate due to an increase in retained austenite.

On the other hand, securement of a long life withstanding rolling fatigue, improvement in crack strength, and prevention of an increase in secular dimensional change rate can be achieved by alloy design of steel. However, alloy design poses problems, such as an increase in raw material cost.

Future bearing components are required to have characteristics enabling use at high temperatures under higher loading conditions as loads and temperatures in environments for use increase. Therefore, bearing components having a long life in respect of rolling fatigue characteristics and having high degrees of crack strength and dimensional stability will be required.

SUMMARY OF THE INVENTION

An object of the invention is to provide a rolling bearing having high degrees of anti-crack strength and dimensional stability and superior in rolling fatigue life.

An rolling bearing of the present invention having an inner ring, outer ring and a plurality of rolling elements, characterized in that at least one of the members, the inner ring, outer ring and rolling elements, has an nitrogen rich layer and in that the grain size number of austenitic crystal grains in said nitrogen rich layer exceeds the number 10.

The nitrogen rich layer is a layer in which the nitrogen content in the surface layer of the raceway ring (outer ring or inner ring) or a rolling element is increased and which can be formed by such treatment as carbonitriding, nitriding or nitrogenizing. The nitrogen content in the nitrogen rich layer is preferably in the range of 0.1-0.7%. If the nitrogen content is less than 0.1%, there is no effectiveness, and the rolling life decreases particularly under foreign matter mixed-in conditions. If the nitrogen content is greater than 0.7%, voids are formed or the retained austenite becomes too much, resulting in loss of hardness or a short life. Concerning the nitrogen rich layer formed in a raceway ring, the nitrogen content refers to its value measured in the 50 μm-deep layer of the raceway surface after grinding. It can be measured, e.g. by EPMA (wavelength diffusion type X-ray micro analyzer).

Further, the fact that the austenite grain size is so small that the grain size number of the austenite crystal grains exceed the number 10, makes it possible to greatly improve the rolling fatigue life. If the grain size number of the austenite grain diameter is the grain size number 10 or less, the rolling fatigue life will not be improved so much; thus, the range should exceed the number 10. Usually, the grain size number should be 11 or more. The smaller the austenite grain size, the more desirable. However, usually, it is hard to obtain a grain size number which exceeds 13. In addition, the austenite grains in said bearing component do not change in the surface layer having the nitrogen rich layer or in the interior inside the same. Therefore, the above-described crystal grain size applies not only to the surface layer but also to the interior of the bearing component. Even after hardening treatment, traces of austenite crystal grain boundaries present immediately before hardening remain, and austenite crystal grains refer to the crystal grains based on the traces, i.e. a vestige of the austenite grain boundary remains in the microstructure and is referred to as the prior austenite grain boundary. The term "austenite grain" here refers to prior austenite grain.

In the rolling bearing of the present invention, since formation of a nitrogen rich layer is followed by fine reduction of austenite grain size to the number 11 or more in terms of grain size number, the rolling fatigue life is greatly improved and superior anti-crack strength and secular dimensional change resistance can be obtained.

The surface layer hardness of the nitrogen rich layer is the range of Hv 700 or more, preferably Hv 720-800. If it is below Hv 700, the life for foreign matter mixed-in decreases. On the other hand, if it exceeds Hv 800, the carbide tends to become too large, leading to the possibility of stress concentration.

Further, when the amount of retained austenite is 11% or so, the foreign matter mixed-in lubrication life decreases, and if it is less than 11%, the foreign matter mixed-in lubrication life tends to further decrease. On the other hand, if the amount of retained austenite is greater than 25%, the amount of retained austenite becomes no different from that for the usual carbonitriding treatment, so that suppression of secular dimensional change becomes impossible. Concerning the raceway ring, the amount of retained austenite is its value measured in the 50 μm-deep layer of the raceway surface after grinding, and can be measured, e.g., by comparison of diffraction intensities for martensite $\alpha$ (211) and retained austenite $\gamma$ (220) measured by X-ray diffraction.

DETAILED DESCRIPTION OF THE INVENTION

Figure 1:
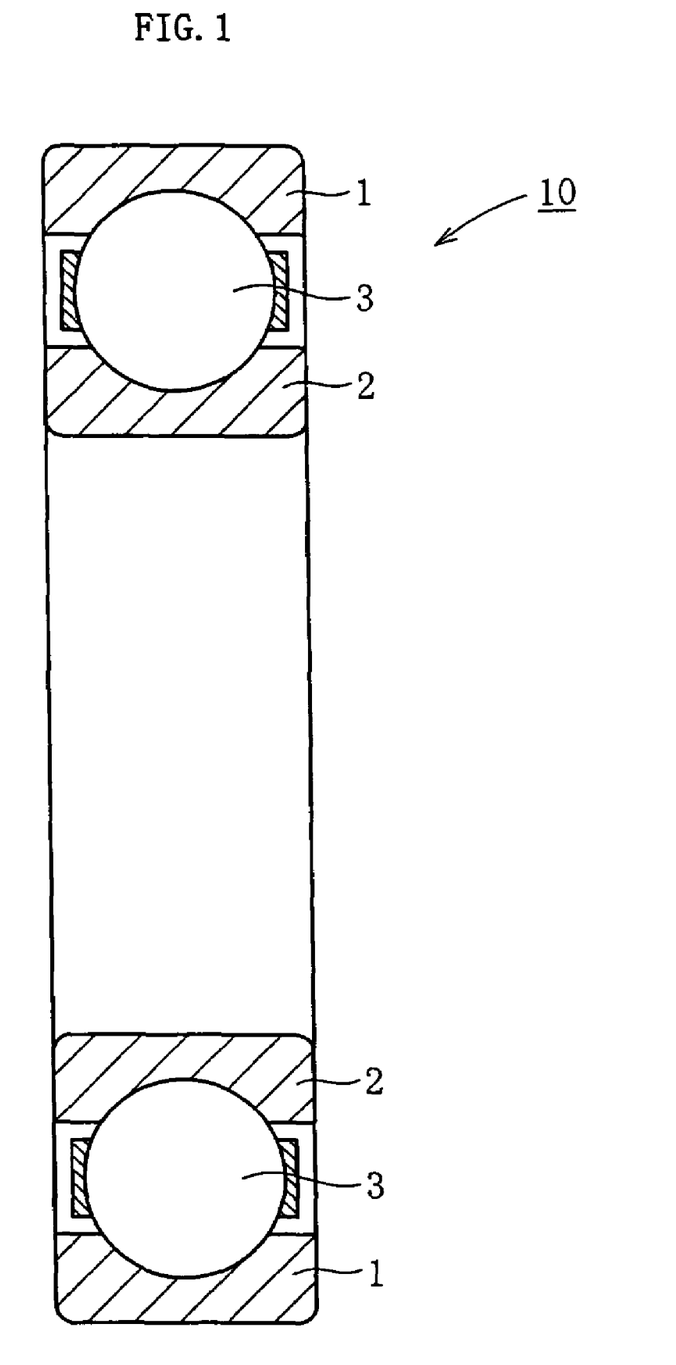
FIG. 1 is a schematic sectional view showing a rolling bearing in the embodiment of the invention.

An embodiment of the invention will now be described using the drawings. FIG. 1 is a schematic sectional view showing a rolling bearing in the embodiment of the invention. In FIG. 1, this rolling bearing 10 mainly has an outer ring 1, an inner ring 2, and rolling elements 3. The figure shows a radial ball bearing, but ball bearings, tapered roller bearings, cylindrical roller bearings, and needle roller bearings are also covered by the invention. The rolling elements 3 are rollably supported by a cage disposed between the outer and inner rings 1 and 2. At least one of these rolling bearing components, the outer and inner rings 1 and 2 and rolling elements 3, has a nitrogen rich layer.

Figure 2:
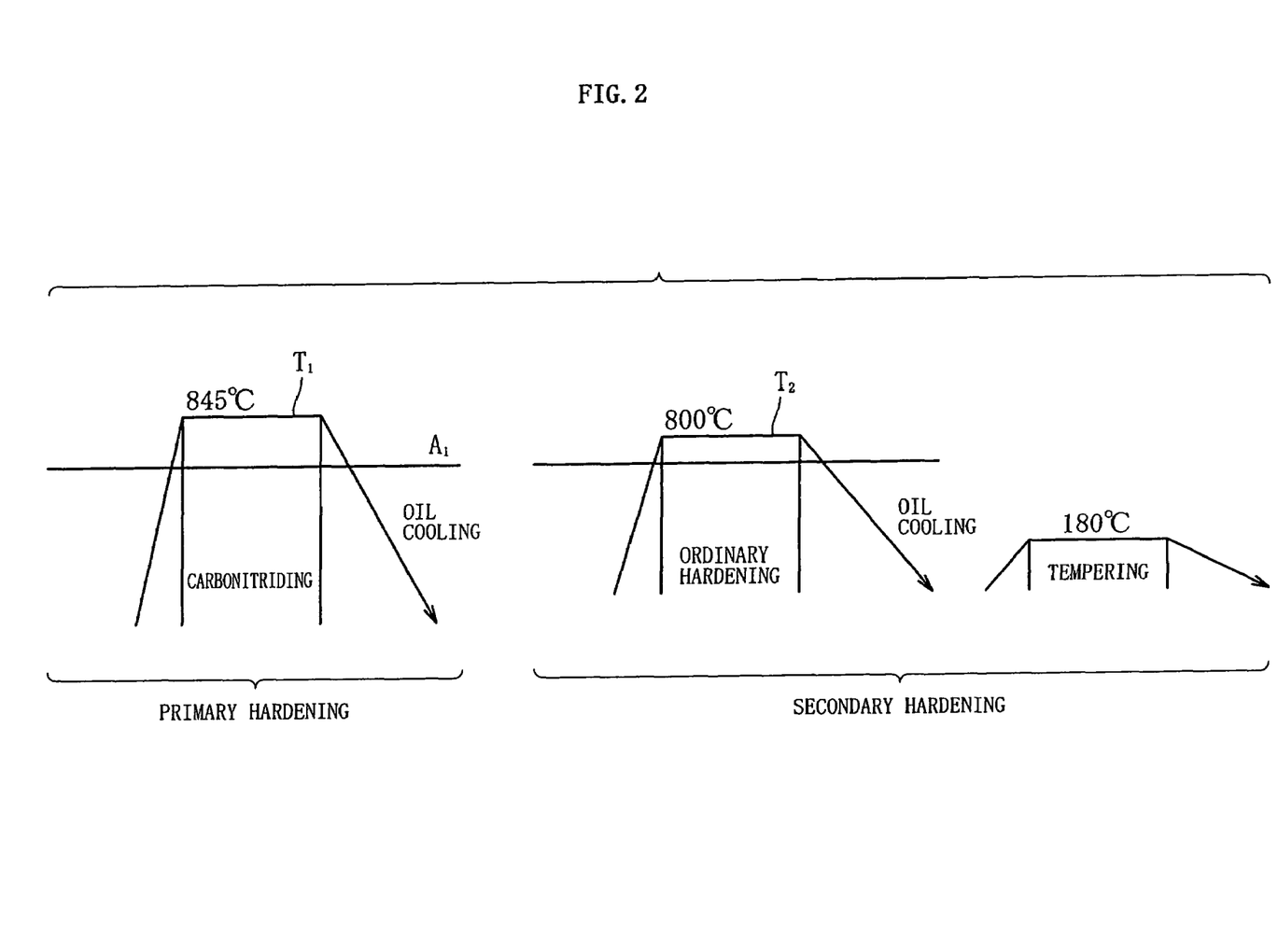
FIG. 2 is a view for explaining a method for heat treating rolling bearings in the embodiment of the invention.
Figure 3:
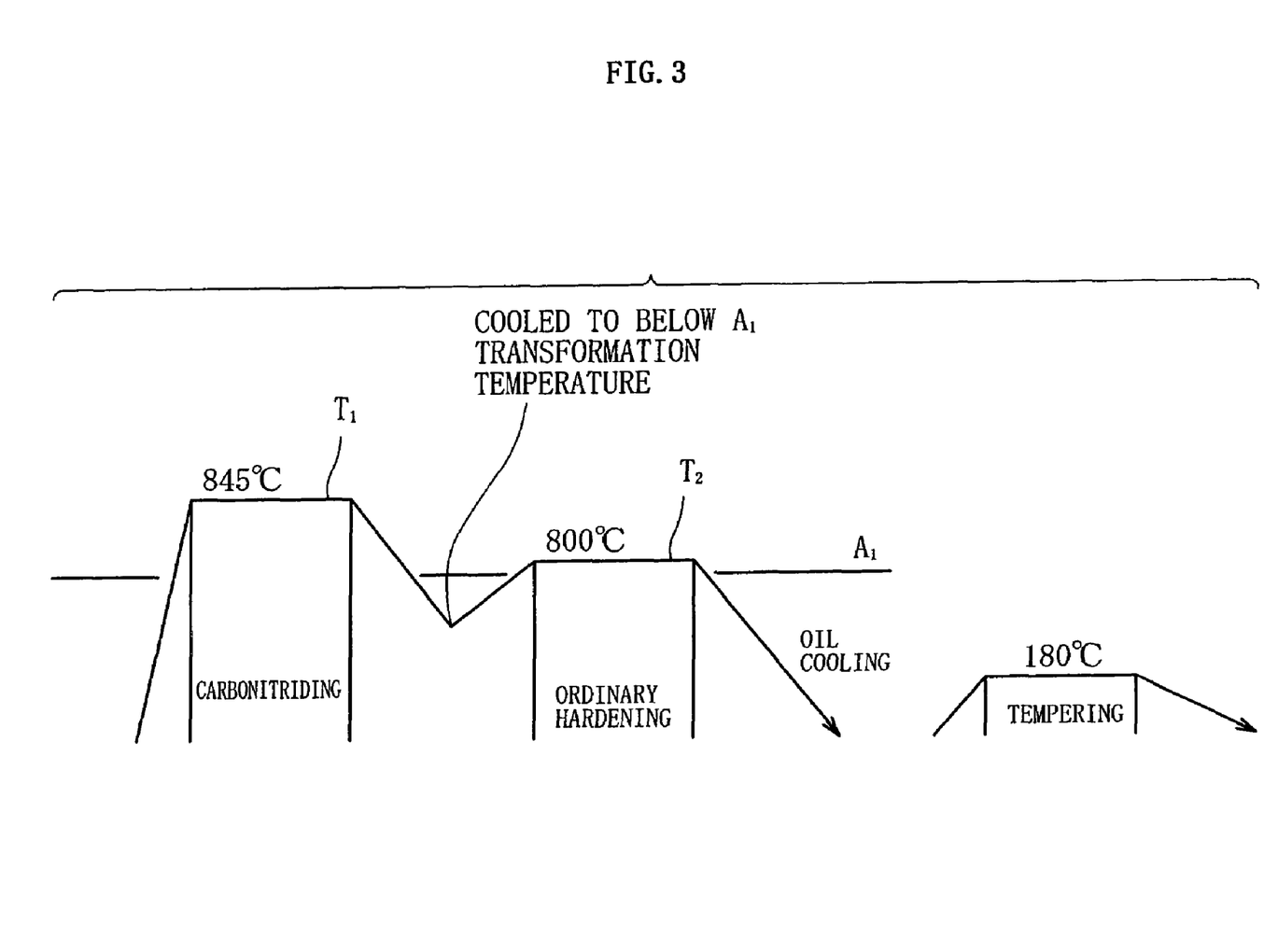
FIG. 3 is a is a view for explaining a modification of the rolling bearing heat treating method in the embodiment of the invention.

A heat treatment including carbonitriding will be described as a concrete example for forming a nitrogen rich layer. FIG. 2 is a view for explaining a method for heat treating rolling bearings in the embodiment of the invention, and FIG. 3 is a view for explaining a modification thereof. FIG. 2 shows a heat treatment pattern showing a method for performing primary and secondary hardenings, and FIG. 3 shows a heat treatment pattern showing a method in which a material is cooled to a temperature less than the $A_1$ transformation temperature in the course of hardening, and then reheated for final hardening. In these figures, at a treatment $T_1$, carbon and nitrogen are diffused into the matrix of steel and in this state sufficient dissolving of carbon in the matrix is effected, whereupon the material is cooed to a temperature less than the $A_1$ transformation temperature. Then, at a treatment $T_2$ in the figure the material is reheated to a temperature above the $A_1$ transformation temperature but below the treatment $T_1$, and from the reheated temperature oil-hardening is effected.

The heat treatments described above make it possible to improve crack strength and decrease secular dimensional change rate while carbonitriding the surface layer portion, more than in the case of the conventional carbonitriding hardening, i.e., carbonitriding immediately followed by hardening once. The rolling bearing of the invention produced by the heat treatment pattern shown in FIG. 2 or 3 has a microstructure in which the grain size of austenite crystal grains is not more than half in the prior art. The bearing component subjected to the above heat treatment has a long life withstanding rolling fatigue, and is improved in crack strength and reduced in secular dimensional change rate. Adoption of the heat treating step to lower the secondary hardening temperature for the purpose of fine size reduction of crystal grains results in a reduction in the amount of retained austenite in the surface layer and in the interior. Therefore, superior anti-crack strength and secular dimensional change resistance can be obtained.

Figure 4A:
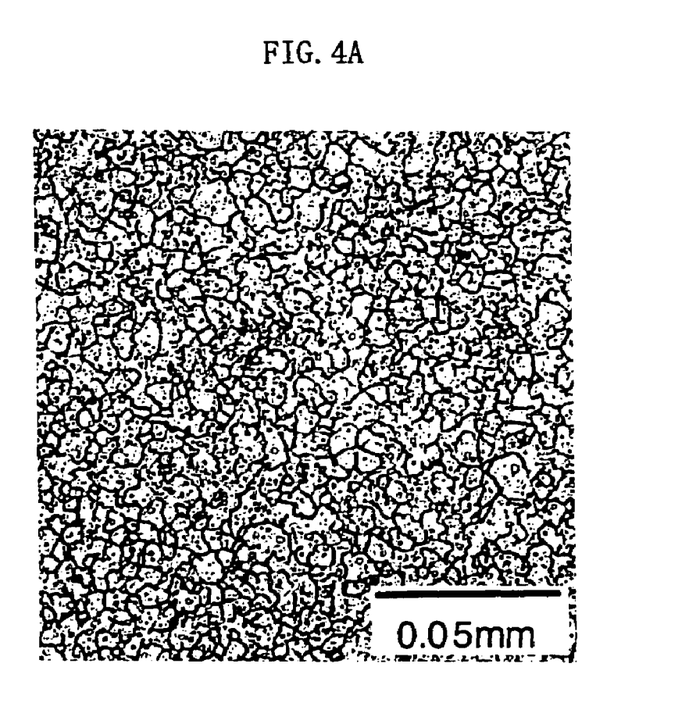
FIG. 4A is a view showing the microstructure of a bearing component, particularly austenite grains in an example of the invention.
Figure 4B:
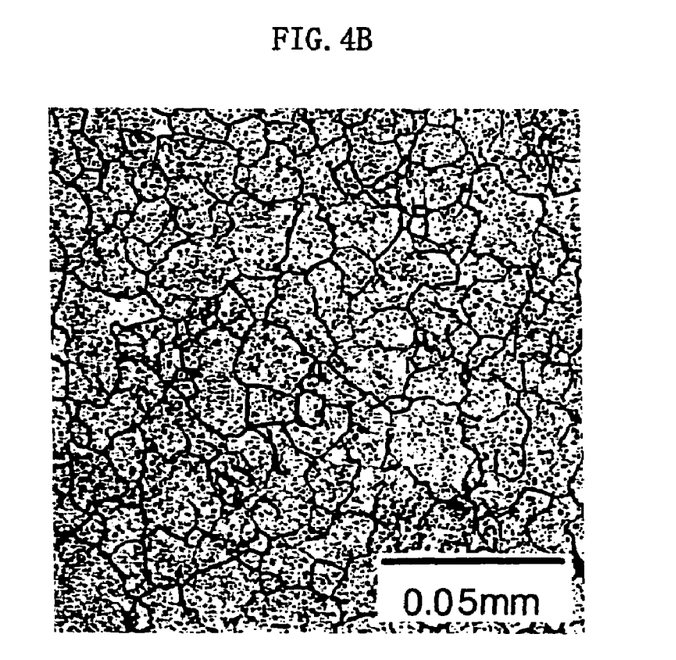
FIG. 4B is a view showing the microstructure of a conventional bearing component, particularly austenite grains.
Figure 5A:
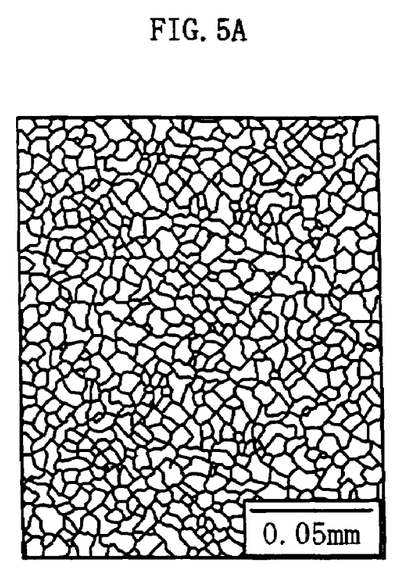
FIG. 5A is a view showing austenite grain boundaries illustrating FIG. 4A.
Figure 5B:
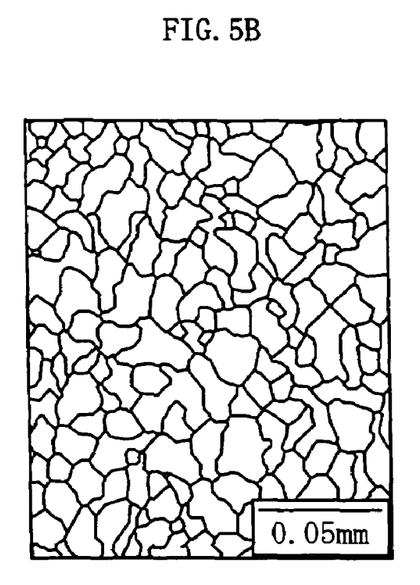
FIG. 5B is a view showing austenite grain boundaries illustrating FIG. 4B.

FIG. 4 is a view showing the microstructure of a bearing component, particularly austenite grains. FIG. 4(*a*) shows a bearing component of the present invention, and FIG. 4(*b*) shows a conventional bearing component. The austenite crystal grains of a raceway ring of a rolling bearing in the embodiment of the invention to which the heat treatment pattern shown in FIG. 2 is applied is shown in FIG. 4(*a*). Further, for comparison purposes, the austenite crystal grain size of a bearing steel heat treated by the conventional method is shown in FIG. 4(*b*). Further, FIGS. 5(*a*) and 5(*b*) show austenite crystal grain sizes illustrating FIGS. 4(*a*) and 4(*b*), respectively. From these structures showing austenite crystal grain sizes it is seen that the conventional austenite grain size is the number 10 in terms of grain size number based on JIS (Japanese Industrial Standards), and according to the heat treating method shown in FIG. 2 or 3, fine grains with the number 12 can be obtained. Further, the average grain diameter in FIG. 4(*a*) was 5.6 μm as measured by the section method.

Examples of the invention will now be described.

EXAMPLE I

Using the JIS SUJ2 Material (1.0 wt % C-0.25 wt % Si-0.4 wt % Mn-1.5 wt % Cr), (1) measurement of hydrogen content, (2) measurement of crystal grain size, (3) Charpy impact test, (4) measurement of breaking stress, and (5) rolling fatigue test were performed. Table 1 shows the results.

TABLE 1

| Sample | A | B | C | D | E | F | Conventional carbonitriding | Ordinary hardening |
|---|---|---|---|---|---|---|---|---|
| Secondary hardening temperature (° C.) | 780 | 800 | 815 | 830 | 850 | 870 | — | — |
| Hydrogen content (ppm) | — | 0.37 | 0.40 | 0.38 | 0.42 | 0.40 | 0.72 | 0.38 |
| Crystal grain size (JIS) | — | 12 | 11.5 | 11 | 10 | 10 | 10 | 10 |
| Charpy impact test (J/cm$^2$) | — | 6.65 | 6.40 | 6.30 | 6.20 | 6.30 | 5.33 | 6.70 |
| Breaking stress (MPa) | — | 2840 | 2780 | 2650 | 2650 | 2700 | 2330 | 2770 |
| Rolling fatigue life ($L_{10}$) Ratio | — | 5.4 | 4.2 | 3.5 | 2.9 | 2.8 | 3.1 | 1 |

The production history of each sample is as follows. Samples A-D (examples of the invention): carbonitriding temperature, 850° C.; the hold time, 150 minutes. The atmosphere was a mixture of RX gas and ammonia gas. In the heat treatment patter shown in FIG. 2, primary hardening is performed from a carbonitriding temperature of 850° C., and the samples were heated from the carbonitriding temperature to a temperature range of 780-830° C. which is lower than the carbonitriding temperature, whereupon secondary hardening was performed. However, the sample A at a secondary hardening temperature of 780° C. was omitted from the subject of test due to insufficient hardening.

Samples E and F (comparative examples): carbonitriding was performed in the same histories of the examples of the invention A-D; and the secondary hardening temperature, 850-870° C. which is higher than the carbonitriding temperature 850° C.

Conventional carbonitrided article (comparative example): carbonitriding temperature, 850° C.; and the hold time, 150 minutes. The atmosphere was a mixture of RX gas and ammonia gas. The article was hardened directly from the carbonitriding temperature, with no secondary hardening.

Ordinary hardened article (comparative example): without carbonitriding, the article was heated to 850° C. and hardened, with no secondary hardening.

The testing method will now be described.

(1) Measurement of Hydrogen Content

Concerning hydrogen content, non-diffusive hydrogen content in steel was analyzed by a LECO Company-made DH-103 type hydrogen analyzer. Diffusive hydrogen content was not measured. The specifications of the LECO Company-made DH-103 type hydrogen analyzer are shown below.

Analytical range: 0.01-50.00 ppm.
Analytical accuracy: ±0.1 ppm or ±3% H (either one which is greater).
Analytical sensitivity: 0.01 ppm.
Detection system: heat conductivity method.
Sample weight size: 10 mg-35 g (maximum: 12 mm in diameter×100 mm in length).
Heating furnace temperature range: 50-1100° C.
Reagent: Anhydrone Mg(ClO$_4$)2, Ascarite NaOH.
Carrier gas: nitrogen gas, gas-dosing gas: hydrogen gas, each gas having a purity of 99.99% or more and a pressure of 40 psi (2.8 kgf/cm$^2$).

The measurement procedures are roughly as follows. Samples are taken by exclusive samplers and the individual samplers are inserted into said hydrogen analyzer. The diffusive hydrogen in the interior is led to a heat conductivity detector by nitrogen carrier gas. In the examples, this diffusive hydrogen was not measured. Then, the samples are taken out of the samplers and heated in a resistance heating furnace, and the non-diffusive hydrogen is led to the heat conductivity detector by nitrogen carrier gas. Measuring the heat conductivity in the heat conductivity detector makes it possible to know the non-diffusive hydrogen content.

(2) Measurement of Crystal Grain Size

Measurement of crystal grain size was made on the basis of an austenite crystal grain size test method for JIS G 0551 Steel.

(3) Charpy Impact Test

Charpy impact test was performed on the basis of a Charpy impact test method for JIS Z 2242 Metal Material. The test pieces used were U-notch test pieces (JIS NO. 3 Test Pieces) shown in JIS Z 2202.

(4) Measurement of Breaking Stress

Figure 6:
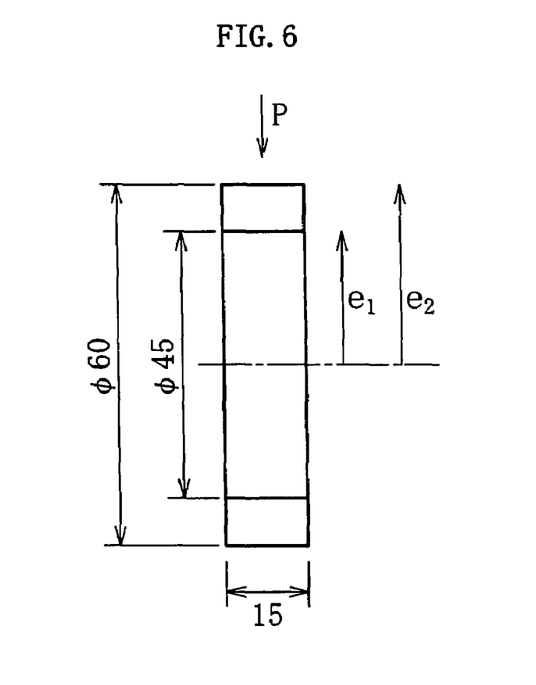
FIG. 6 is a view showing a test piece for hydrostatic crush strength test (measurement of breaking stress)

FIG. 6 is a view showing a test piece for hydrostatic crush strength test (measurement of breaking stress). A load is applied in the direction P shown in the figure and the load increased until breaking, is measured. Then, the breaking load obtained is converted to a stress value by a stress calculation formula for bent beams shown below. In addition, the test piece is not limited to the one shown in FIG. 6, and test pieces of other shape may be used.

Let $\sigma_1$ and $\sigma_2$ be the fiber stresses in the concave and convex surfaces of the test piece of FIG. 6, respectively. Then $\sigma_1$ and $\sigma_2$ are found by the following formulas (Mechanical Engineering Handbook Chapter A4 Strength of Materials, A4-40). Herein, N is the axial force in a section including the axis of an annular test piece; A is the cross sectional area; $e_1$ is the outer radius; $e_2$ is the inner radius. Further, $\kappa$ is the modulus of section of a bent beam.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 - e_2/\{\kappa(\rho_0 - e_2)\}]$$

$$\kappa = -(1/A)\int_A \{\eta/(\rho_0 + \eta)\} dA$$

(5) Rolling Fatigue Life

Figure 7A:
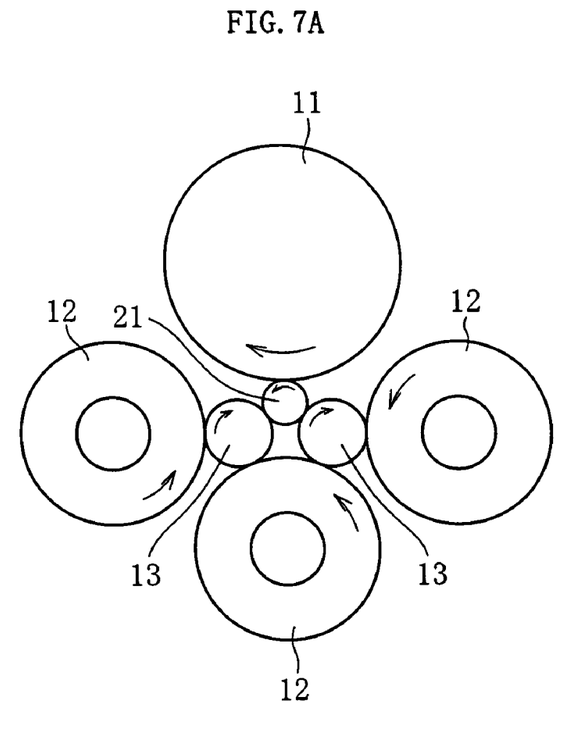
FIG. 7A is a schematic front view of a rolling fatigue life testing machine.
Figure 7B:
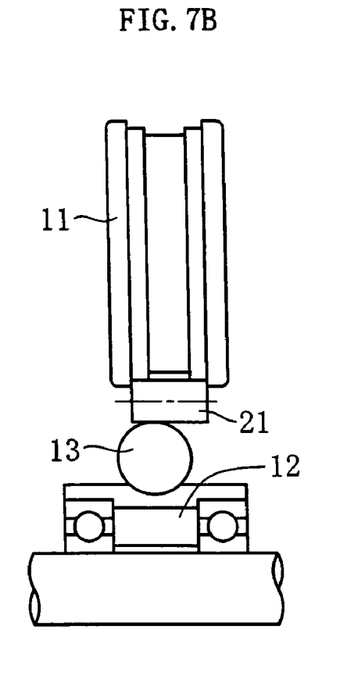
FIG. 7B is a schematic side view of the rolling fatigue life testing machine.

Test conditions for rolling fatigue life test are shown in Table 2. Further, FIG. 7 is schematic view of a rolling fatigue life testing machine. FIG. 7(*a*) is a front view; and FIG. 7(*b*) is a side view. In FIGS. 7(*a*) and 7(*b*), a rolling fatigue life test piece 21 is driven by a drive roll 11, and is rotating in contact with balls 13. The balls 13 are ¾ inch balls, and while being guided by a guide roll 12, they are rolling while applying high surface pressure to the rolling fatigue life test piece 21 held therebetween.

The test results of the example I shown in Table 1 are described below.

(1) Hydrogen Content

A conventional carbonitrided article, as carbonitrided, has a very high value of 0.72 ppm. This is thought to be due to the fact that the ammonia (NH$_3$) contained in an atmosphere for carbonitriding decomposes and hydrogen enters the steel. In contrast, the samples B-D have their hydrogen content reduced to almost half, 0.37-0.40 ppm. This hydrogen content is on the same level as that of ordinary hardened articles.

The above-mentioned reduction in hydrogen content makes it possible to reduce the brittleness of steel due to solution of hydrogen in a solid. That is, by the reduction in hydrogen content, the Charpy impact values of the samples B-D of the invention are greatly improved.

(2) Crystal Grain Size

Concerning crystal grain size, in the case where the secondary hardening temperature is lower than the temperature for hardening (primary hardening) at the time of carbonitriding, that is, in the case of the samples B-D, austenite grains are remarkably finely reduced in size to the extent of the crystal grain numbers 11-12. The austenite grains in the samples E and F, and in the conventional carbonitrided article and ordinary hardened article are of the crystal grain size number 10, which means that they are coarser crystal grains than in the samples B-D of the present invention.

(3) Charpy Impact Test

According to Table 1, as compared with the Charpy impact value of the conventional carbonitrided article being 5.33 J/cm$^2$, the Charpy impact values of the samples B-D of the invention are as high as 6.30-6.65 J/cm$^2$. Of these samples, those which are lower in secondary hardening temperature tend to increase in Charpy impact value. The Charpy impact value of the ordinary hardened article is as high as 6.70 J/cm$^2$.

(4) Measurement of Breaking Stress

The breaking stress corresponds to anti-crack strength. According to Table 1, the breaking stress value of the conventional carbonitrided article is 2330 MPa. As compared with this, the breaking stress values obtained of the samples B-D have been improved, being 2650-2840 MPa. The breaking stress value of the ordinary hardened article is 2770 MPa, and the improved anti-crack strength of the samples B-D is assumed to be largely due to the effect of the reduction of hydrogen content, as well as the effect of the fine size reduction of austenite crystal grains.

(5) Rolling Fatigue Test

According to Table 1, reflecting the fact that the ordinary hardened article does not have a carbonitrided layer in the surface layer, the rolling fatigue life $L_{10}$ is at a minimum. As compared with this, the rolling fatigue life of the conventional carbonitrided article is 3.1 times as high. The rolling fatigue life of the samples B-D is improved much more than that of the conventional carbonitrided article. The samples E and F are substantially the same in this point as the conventional carbonitrided article. To summarize, the samples B-D of the invention have their hydrogen content reduced, austenite crystal grain size reduced in size to the number 11 or more, and Charpy impact value, anti-crack strength and rolling fatigue life all improved.

EXAMPLE II

An example II will now be described. A series of test were conducted on the following X-material, Y-material and Z-material. The heat treatment raw material used was JIS SUJ2 MATERIAL (1.0 WT % C-0.25 wt % Si-0.4 wt % Mn-1.5 wt % Cr), applied commonly to the X-material-Z-material. The production histories of the X-material-Z-material are as follows.

X-material (comparative example): ordinary hardening alone (not carbonitrided).

Y-material (comparative example): hardened immediately after carbonitriding (conventional carbonitriding hardening). The carbonitriding temperature was 845° C., and the hold time was 150 minutes. The atmosphere for carbonitriding was RX gas+ammonia gas.

Z-material (example of the invention): a bearing steel subjected to the heat treatment pattern of FIG. 2. The carbonizing temperature was 845° C., and the hold time was 150 minutes. The atmosphere for carbonitriding was RX gas+ ammonia gas. The final hardening temperature was 800° C.

(1) Rolling Fatigue Life

The rolling fatigue life test conditions and test device, as described above, are as shown in Table 2 and FIG. 7. The rolling fatigue life test results are shown in Table 3.

TABLE 2

| Test piece | Φ 12 × L22 cylindrical test piece |
| --- | --- |
| Number of tests | 10 |
| Mating steel ball | ¾ inch (19.05 mm) |
| Contact surface pressure | 5.88 GPa |
| Speed under load | 46240 cpm |
| Lubricating oil | Turbine VG68, forced circulation oiling |

TABLE 3

| | Life (rpm under load) | | |
| --- | --- | --- | --- |
| Material | $L_{10}$ (×10$^4$) | $L_{50}$ (×10$^4$) | $L_{10}$ ratio |
| X-material | 8017 | 18648 | 1.0 |
| Y-material | 24656 | 33974 | 3.1 |
| Z-material | 43244 | 69031 | 5.4 |

According to Table 3, the Y-material in the comparative example exhibits 3.1 times the $L_{10}$ life (life such that one of 10 test pieces breaks) of the X-material, also in the comparative example, having ordinary hardening alone applied thereto; a life prolongation effect due to carbonitriding is recognized. In contrast, the Z-material of the invention exhibits a long life which is 1.74 times the life of the B-material and 5.4 times the life of the X-material. The main factor of this improvement is thought to be due to fine size reduction of microstructure.

(2) Charpy Impact Test

The Charpy impact test was performed using U-notch test pieces by a method based on said JIS Z2242. Test results are shown in Table 4.

TABLE 4

| Material | Charpy impact value (J/cm$^2$) | Ration of impact value |
| --- | --- | --- |
| X-material | 6.7 | 1.0 |
| Y-material | 5.3 | 0.8 |
| Z-material | 6.7 | 1.0 |

The Charpy impact test of the Y-material (comparative example) subjected to carbonitriding was not higher than that of the X-material (comparative example) subjected to ordinary hardening, but the Z-material was equal in this value to the X-material.

(3) Test for Hydrostatic Fracture Toughness Value

Figure 8:
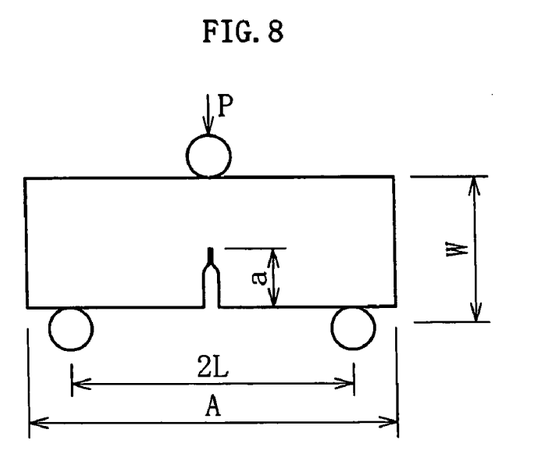
FIG. 8 is a view showing a test piece for hydrostatic fracture toughness test.

FIG. 8 is a view showing a test piece for hydrostatic fracture toughness test. After a pre-crack of about 1 mm was introduced to the notched section of this test piece, a hydrostatic load by 3-point bending was applied to find the breaking load P. A formula (1) shown below was used to calculate the fracture toughness value ($K_{1c}$ value). The test results are shown in Table 5.

$$K_{1c} = (PL\sqrt{a}/BW^2)\{5.8 - 9.2(a/W) + 43.6(a/W)^2 - 75.3(a/W)^3 + 77.5(a/W)^4\} \quad (1)$$

TABLE 5

| material | Number of tests | $K_1C$ (MPa $\sqrt{m}$) | $K_1C$ ratio |
| --- | --- | --- | --- |
| X-material | 3 | 16.3 | 1.0 |
| Y-material | 3 | 16.1 | 1.0 |
| Z-material | 3 | 18.9 | 1.2 |

Since the pre-crack depth was greater than the carbonitrided layer depth, there was no difference between the comparative example X-material and Y-material. However, the Z-material of the invention obtained about 1.2 times the value for the comparative examples.

(4) Hydrostatic Crush Strength Test

The hydrostatic crush strength test piece used, as described above, was one shaped as shown in FIG. 6. In the figure, hydrostatic crush strength tests were conducted by applying a load in the direction P. The test results are shown in Table 6.

TABLE 6

| Material | Number of tests | Hydrostatic crush strength (kgf) | hydrostatic crush strength ratio |
|---|---|---|---|
| X-material | 3 | 4200 | 1.00 |
| Y-material | 3 | 3500 | 0.84 |
| Z-material | 3 | 4300 | 1.03 |

The Y-material subjected to carbonitriding has a lower value than the X-material subjected to ordinary hardening. However, the Z-material of the example of invention is improved in hydrostatic crush strength over the Y-material and attains a level which compares favorably with that of the X-material.

(5) Secular Dimensional Change Rate

The results of measurement of secular dimensional change rate at a hold temperature of 130° C., for a hold time of 500 hours, are shown in Table 7 together with the surface hardness and the amount of retained austenite (at a depth of 50 μm).

TABLE 7

| Material | Number of tests | Surface hardness (HRC) | Amount of retained γ (%) | Dimensional change rate ($\times 10^{-5}$) | Dimensional change rate ratio |
|---|---|---|---|---|---|
| X-material | 3 | 62.5 | 8.8 | 18 | 1.0 |
| Y-material | 3 | 63.6 | 30.5 | 35 | 1.9 |
| Z-material | 3 | 60.0 | 11.8 | 22 | 1.2 |

It can be seen that as compared with the dimensional change rate of the Y-material having much retained austenite, that of the Z-material of the example of invention is suppressed to half or less.

(6) Rolling Life Test Under Foreign Matter Mixed-in Conditions

Using a ball bearing 6206, the rolling fatigue life under foreign matter mixed-in conditions with a predetermined amount of standard foreign matter mixed-in was evaluated. The test conditions are shown in Table 8, and the test results are shown in Table 9.

TABLE 8

| Load | Fr = 6.86 kN |
|---|---|
| Contact surface pressure | Pmax = 3.2 GPa |
| Rotative speed | 2000 rpm |

TABLE 8-continued

| Lubrication | Turbine 56 oil bath oiling |
|---|---|
| Amount of foreign matter | 0.4 g/1000 cc |
| Foreign matter | Grain size 100-180 μm, hardness Hv 800 |

TABLE 9

| Material | $L_{10}$ life (h) | $L_{10}$ ratio |
|---|---|---|
| X-material | 20.0 | 1.0 |
| Y-material | 50.2 | 2.5 |
| Z-material | 45.8 | 2.3 |

As compared with the X-material, the Y-material subjected to the conventional carbonitriding exhibited a long life which was about 2.5 times as high. Further, the Z-material of the example of invention obtained a long life which was 2.3 times as high. The Z-material of the example of invention, though low in retained austenite content as compared with the Y-material of comparative example, has obtained a long life of substantially the same degree due to the influence of entrance of nitrogen and to finely reduced microstructure.

It has been found from the above results that the Z-material, i.e., the example of the invention can simultaneously satisfy three items, the prolongation of rolling fatigue life, improvement in crack strength, and reduction of secular dimensional change rate, which have been difficult to achieve by the conventional carbonitriding.

EXAMPLE III

Table 10 shows the results of tests conducted on the relation between nitrogen content and rolling life under foreign matter mixed-in conditions. In addition, the comparative example 1 is a standard hardened article, and the comparative example 2 is a standard carbonitrided article. The comparative example 3 corresponds to the case in which the same treatment as in the example of the invention is applied but the nitrogen content alone is excessive. The test conditions are as follows. Sample bearing: tapered roller bearing 30206 (the inner and outer rings and rollers are made of high carbon chromium bearing steel class 2 (SUJ2) based on JIS).

Radial load: 17.64 kN.
Axial load: 1.47 kN.
Rotative speed: 2000 rpm.
Hard foreign matter mixed-in 1 g/L

TABLE 10

| No. | Nitrogen content (%) | Retained austenite (%) | Hardness (Hv) | Rolling life with foreign matter mixed-in (h) | Austenite crystal grain size | Remarks |
|---|---|---|---|---|---|---|
| 1 | 0.11 | 14 | 725 | 321 | 11.8 | Example 1 |
| 2 | 0.16 | 18 | 735 | 378 | 12.0 | Example 2 |
| 3 | 0.18 | 20 | 730 | 362 | 11.9 | Example 3 |
| 4 | 0.32 | 22 | 730 | 396 | 12.1 | Example 4 |
| 5 | 0.61 | 24 | 715 | 434 | 12.2 | Example 5 |
| 6 | 0 | 8 | 770 | 72 | 9.8 | Comparative example 1 |
| 7 | 0.32 | 32 | 710 | 155 | 10.0 | Comparative example 2 |
| 8 | 0.72 | 31 | 700 | 123 | 12.0 | Comparative example 3 |

It can be seen from Table 10 that concerning examples 1-5, the nitrogen content and foreign matter life are in substantially proportional relation. However, for the comparative example 3 with a nitrogen content of 0.72, in the light of the rolling life with foreign matter mixed-in being extremely lowered, it is preferable that the upper limit of nitrogen content be 0.7.

From the examples II and III, it can be seen that the preferable range of retained austenite content is 11-25%. The retained austenite content is measured, for example, by comparison between the diffraction intensities of martensite $\alpha$ (211) and retained austenite $\gamma$ (220) determined by X-ray diffraction. Values are taken at a depth of 50 μm in the surface layers of the raceway ring and rolling element after grinding.

The embodiments disclosed this time shall be taken to be exemplary in all respects and not restrictive. The scope of the invention is intended to be indicated by Claims, not by the above description, and all modifications that are within the meaning equivalent to Claims and scope are intended to be included in the invention.

What is claimed is:

1. A rolling bearing comprising:
an outer ring;
an inner ring; and
a plurality of rolling elements, wherein at least one of said outer ring, inner ring and rolling elements has a nitrogen rich layer, said at least one of said outer ring, inner ring and rolling elements is made of SUJ2 steel as defined by Japanese Industrial Standard, and a grain size number defined by Japanese Industrial Standard of austenite crystal grains in said nitrogen rich layer is greater than 10.

2. A rolling bearing as set forth in claim 1, wherein a nitrogen content in said nitrogen rich layer is in the range of 0.1-0.7%.

3. A rolling bearing as set forth in claim 2, wherein said at least one of said outer ring, inner ring and rolling elements is a raceway ring, and said nitrogen content is a nitrogen content measured in a 50 μm-deep layer of a raceway surface after grinding.

4. A rolling bearing as set forth in claim 1, wherein a hardness in said nitrogen rich layer is not less than Hv 700.

5. A rolling bearing as set forth in claim 4, wherein said at least one of said outer ring, inner ring and rolling elements is a raceway ring and said hardness is a value in a 50 μm-deep layer of a raceway surface after grinding.

6. A rolling bearing as set forth in claim 4, wherein the hardness is within the range of Hv 720-Hv 800.

7. A rolling bearing as set forth in claim 6, wherein said at least one of said outer ring, inner ring and rolling elements is a raceway ring and said hardness is a value in a 50 μm-deep layer of a raceway surface after grinding.

8. A rolling bearing as set forth in claim 1, wherein a retained austenite content in said nitrogen rich layer is in the range of 11-25%.

9. A rolling bearing as set forth in claim 8, wherein a nitrogen content in said nitrogen rich layer is in the range of 0.1-0.7%.

10. A rolling bearing as set forth in claim 9, wherein said at least one of said outer ring, inner ring and rolling elements is a raceway ring and said nitrogen content is a nitrogen content measured in a 50 μm-deep layer of a raceway surface after grinding.

* * * * *